United States Patent
Li et al.

(10) Patent No.: US 11,200,284 B1
(45) Date of Patent: Dec. 14, 2021

(54) OPTIMIZATION OF FEATURE EMBEDDINGS FOR DEEP LEARNING MODELS

(71) Applicant: Facebook, Inc., Menlo Park, CA (US)

(72) Inventors: Miao Li, Fremont, CA (US); Sagar Chordia, Redwood City, CA (US); Harsh Doshi, San Francisco, CA (US); Xianjie Chen, Fremont, CA (US); Qin Huang, Irvine, CA (US)

(73) Assignee: Facebook, Inc., Menlo Park, CA (US)

( * ) Notice: Subject to any disclaimer, the term of this patent is extended or adjusted under 35 U.S.C. 154(b) by 666 days.

(21) Appl. No.: 15/967,414

(22) Filed: Apr. 30, 2018

(51) Int. Cl.
*G06F 16/00* (2019.01)
*G06F 16/904* (2019.01)
*G06N 3/04* (2006.01)
*G06K 9/62* (2006.01)
*G06F 16/901* (2019.01)

(52) U.S. Cl.
CPC ........ *G06F 16/904* (2019.01); *G06F 16/9014* (2019.01); *G06K 9/6223* (2013.01); *G06N 3/04* (2013.01)

(58) Field of Classification Search
CPC ..... G06F 16/5866; G06F 40/169; G06F 40/30
See application file for complete search history.

(56) References Cited

U.S. PATENT DOCUMENTS

| 2017/0206465 | A1* | 7/2017 | Jin | ........................... G06N 3/08 |
| 2018/0068371 | A1* | 3/2018 | Krishnamurthy | .... G06N 3/0427 |
| 2018/0197108 | A1* | 7/2018 | Fang | ...................... G06Q 30/02 |
| 2018/0336490 | A1* | 11/2018 | Gao | ........................ G06N 7/005 |
| 2019/0251476 | A1* | 8/2019 | Shiebler | ................. G06F 17/16 |

* cited by examiner

*Primary Examiner* — Yicun Wu
(74) *Attorney, Agent, or Firm* — Fenwick & West LLP (57) ABSTRACT

A system trains models to generate embeddings that represent likelihoods associated with features. For example, an embedding may be generated for users and pages such that a user's embedding represents how likely a user is to comment on a given page. Initially, memory space for storing each embedding may be overprovisioned. The system monitors the embeddings for a feature as they are generated and recalculated over time. If the system detects that a particular index value is never updated for embeddings of that feature, then the system may remove that value from the feature embeddings. This allows the array lengths of embeddings to be customized to the particular features they represent, saving memory space. The system may further use related information to identify pooling functions that are most effective for particular features, to identify similarities between entities, and to provide insight into how the feature data influences neural network layers.

18 Claims, 7 Drawing Sheets

OPTIMIZATION OF FEATURE EMBEDDINGS FOR DEEP LEARNING MODELS

BACKGROUND

This disclosure relates generally to deep learning models, and in particular to optimizing memory allocations and operating parameters for predictive models.

Deep learning has become a popular tool for analyzing data and making predictions about the data. For example, neural networks are used to solve complex problems in machine translation, image processing, targeted advertising, bioinformatics, and other fields. However, developers rarely examine the inner workings of their deep learning models, which can involve many layers of data transformations. Thus, although a deep learning structure may effectively model a system, models, and their inputs, the deep learning structure may not be designed to efficiently use computing resources, computing time, and memory space.

Furthermore, the efficiency and effectiveness of individual neural network layers is rarely examined after a neural network has been trained. In some instances, certain pooling functions may even obscure information present in the input data.

SUMMARY

A system allows developers to examine how effective representations of feature data are likely to be at influencing computer models. The system further facilitates adjustment of feature representations to optimize use of memory space, computing resources, and computing time. In one embodiment, the detection of features that are likely to be influential as inputs to a predictive computer model is automatic, and the system may also adjust program and memory allocations automatically.

Sparse feature data is stored by an online system. In some embodiments, data for individual features may be stored in relation to individual users, content items, webpages, or other objects associated with the online system. To represent feature data for individual objects as they relate to one another, the data may be used to generate embeddings that represent individual objects and their similarities to other objects in terms of the feature. An embedding is an array of values. The values for a particular object may represent learned latent characteristics of the object. These values within an embedding may be accessed or referenced by an index number.

When the online system generates embeddings for a new feature, memory space is allocated to store the embeddings. Each embedding represents an object with respect to one particular type of interaction or feature. In allocating memory space to store the embeddings, the online system allocates space for each array of values by reserving enough memory for each expected embedding. For example, the online system may allocate space to store embeddings for a feature by allocating memory space for an expected number of embeddings to each be an array with a length of 100,000 representative values.

In some cases, embeddings for a particular feature may not require as many values as the online system has allocated to effectively represent objects and their interactions. The online system detects whether this is the case by regenerating embeddings for the feature over time as new data about interactions of objects with the online system become available. The online system compares values at each index of a newly generated embedding with values at each corresponding index of an older embedding to determine how much the newly-generated embeddings modify the values at each index position. If values of certain indices of the embeddings have insignificant or no change over time, then the online system retrains a computer model that generates the embeddings to remove the values generated for those indices. Accordingly, the memory space allocated for the embeddings can be reduced, saving space, computer processing time, and resources that would otherwise be used to generate and store those values.

Examination of embeddings can provide other benefits to computer modelling beyond improving the allocation of memory space. In some embodiments, the online system produces visualizations of embedding values to help determine how effective the embeddings may be as inputs to predictive computer models. For example, the online system may compare the effect of different pooling functions on embeddings by producing visualizations of how tightly or loosely clustered the embedding data becomes after each pooling function is applied. In another example, the online system can generate visualizations of embedding accuracy by presenting distributions of how well the online system was able to discern between easy and hard embedding values.

Optimization of memory space and a better understanding of the way that embeddings and pooling functions affect data within the online system allows programmers to build more efficient and effective computer models and neural network layers. For example, a developer can view the visualizations to understand which pooling functions tend to produce clustered data from embeddings for a particular feature, which can inform the developer as to whether the pooling functions used in a neural network layer should be changed for the model to best learn from the data.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
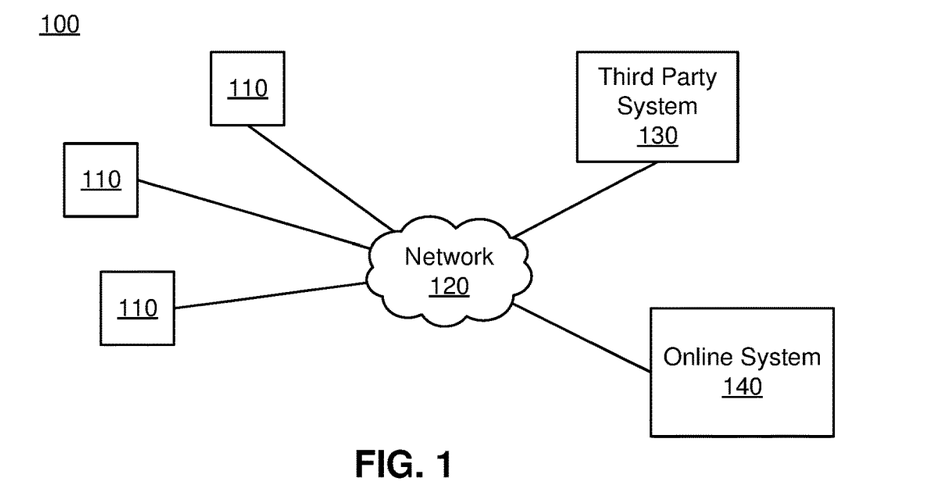
FIG. 1 is a block diagram of a system environment in which an online system operates, in accordance with an embodiment.

FIG. 1 is a block diagram of a system environment in which an online system operates, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 may be a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
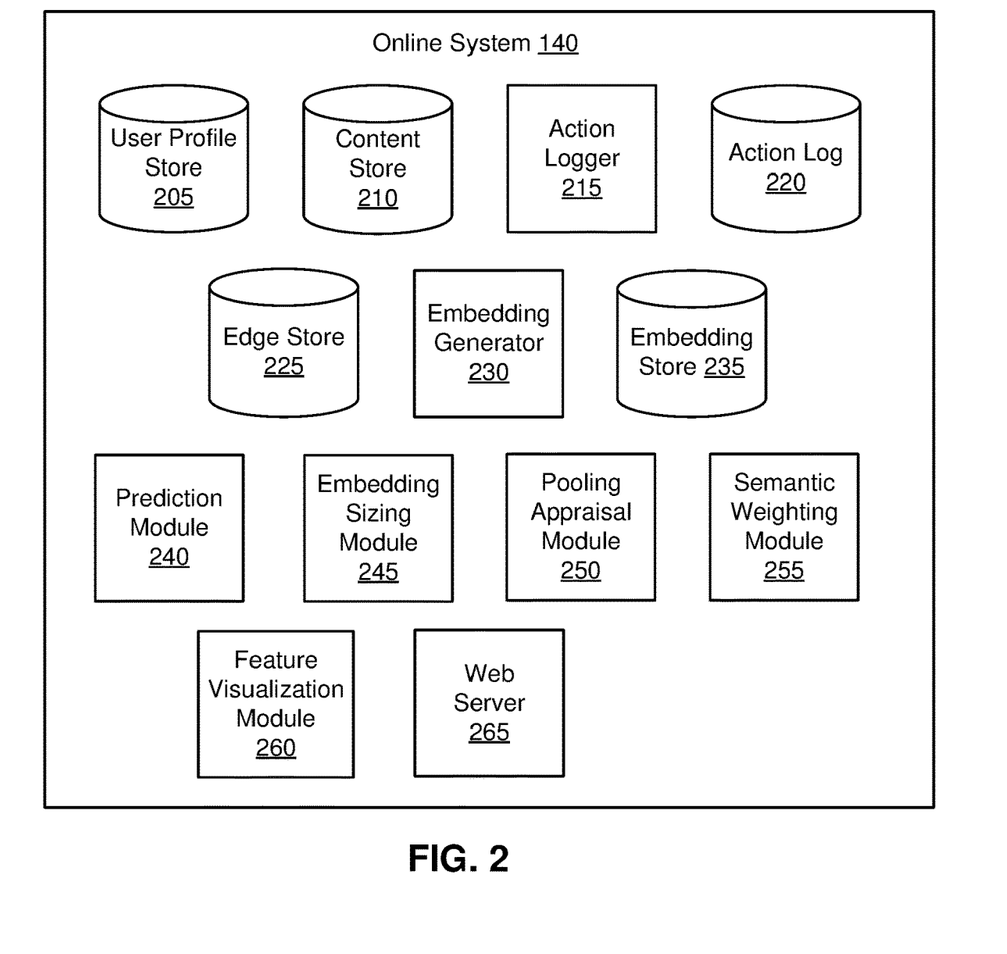
FIG. 2 is a block diagram of an architecture of the online system, in accordance with an embodiment.

FIG. 2 is a block diagram of an architecture of the online system 140, in accordance with an embodiment. The online system 140 shown in FIG. 2 includes a user profile store 205, a content store 210, an action logger 215, an action log 220, an edge store 225, an embedding generator 230, an embedding store 235, a prediction module 240, an embedding sizing module 245, a pooling appraisal module 250, a semantic weighting module 255, a feature visualization module 260, and a web server 265. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 240, events, groups or applications. In some embodiments, objects are received from third-party applications or third-party applications separate from the online system 240. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The embedding generator 230 generates embeddings that represent entities of the online system 140. An embedding is an array of values that describes an object in a latent space. As an array, an embedding has a length, and each index in the array has a value.

Multiple embeddings may be generated to represent an entity of the online system 140 with respect to different features. As such, embeddings are sometimes referred to as feature embeddings. As an example, between users and content items, the embedding generator 230 may have a model to produce embeddings for a "like," a model to produce embeddings for a "share," a model to produce embeddings for commenting, and so forth. The embedding generator 230 may also generate feature embeddings to represent interactions of a user with sponsored content or with pages of the online system 140.

In generating embeddings, the values in a latent space are inferred through a mathematical model from other observable variables. For example, user interactions with content items (which are observable) can be used to generate embeddings for the users and the content items such that similar embeddings between two users (or two content items) suggests those users (or items) have interactions with similar content items. In some embodiments, the embedding generator 230 generates embeddings for other entities associated with the online system 140 such as content items (e.g., stories, posts, and advertisements) stored in the content store 210.

Figure 3A:
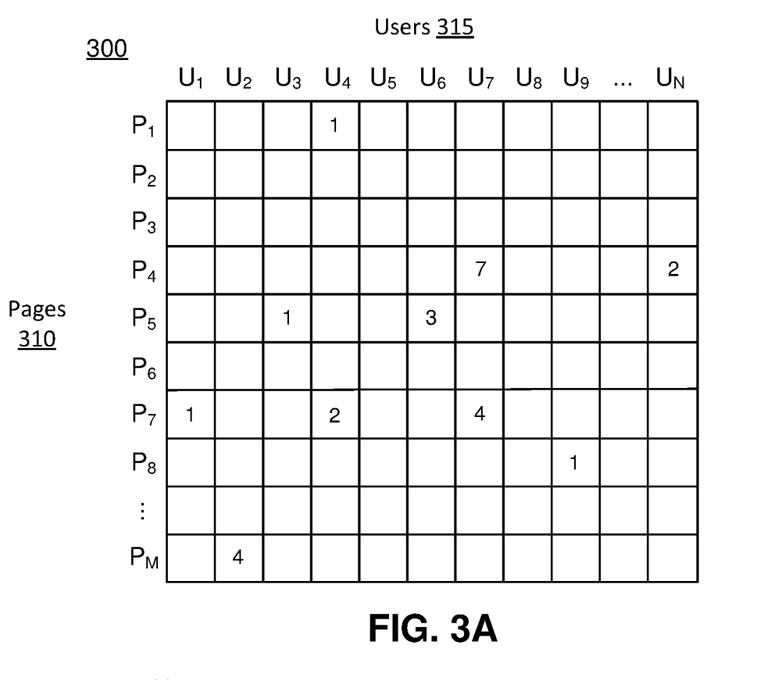
FIG. 3A is an example sparse matrix showing user interactions with pages of an online system, in accordance with an embodiment.

FIG. 3A is an example sparse matrix 300 showing user 315 interactions with pages 310 of an online system 140, in accordance with an embodiment. In some embodiments, training data for the embedding generator 230 can be represented in the form of sparse matrices, the data for which may be stored in the action log 220, user profile store 205, or content store 210. A sparse matrix is a matrix for which most of the elements have a zero value, or for which most elements have no assigned value. For example, values in the sparse matrix 300 shown in FIG. 3A could represent a number of comments made by users 315 (columns $U_1$-$U_N$) on pages 310 (rows $P_1$-$P_M$). When the online system 140 has many users and many pages each single user is exposed to a comparatively small number of these pages, and typically will interact with only a portion of those. Accordingly, the dimensions of the sparse matrix 300 may be very large relative to the actual number of users and items.

The embedding generator 230 generates embeddings based on interactions between users and pages or between users and content items. That is, the embeddings are generated so that values in the embedding array of a user and the values in the embedding arrays of pages or content items that the user engages with are similar (i.e., a comparison of values of the arrays at the same indices reveals a similar value). Accordingly, users who interact with similar pages will have similar embeddings. The embedding store 235 stores information about the values of past and current embeddings that represent entities of the online system 140.

Figure 3B:
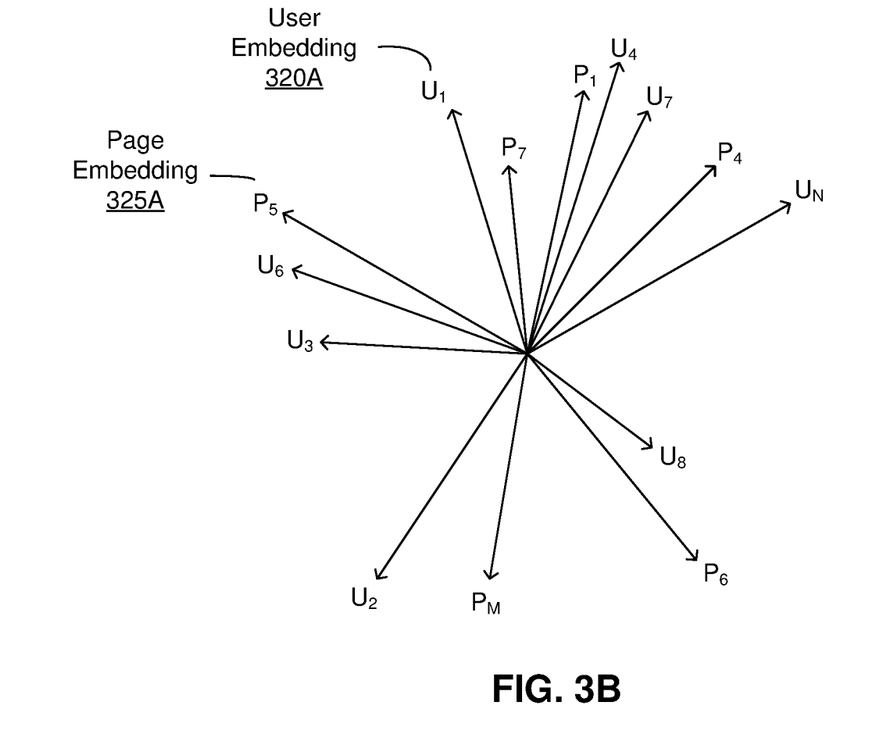
FIG. 3B illustrates an example of a latent space in which some entities are represented, in accordance with an embodiment.

FIG. 3B illustrates an example of a latent space in which some entities are represented, in accordance with an embodiment. One way to think of embeddings is as vectors within a multidimensional latent space. That is, each index in an array of an embedding can be thought of as a dimension, and the value at the index represents the value of the embedding in that dimension. Two embeddings are similar if they have similar values at each index. When visualizing the embeddings as vectors, such a similarity manifests in vectors that point in similar directions. Thus, the similarity of two entities can be determined by calculating the cosine similarity between the vectors associated with the entities. In the example of FIG. 3B, since user $U_4$ has interacted with pages $P_1$ and $P_7$ (e.g., by posting comments on the pages), the vector for $U_4$ is closer in proximity to the vectors for $P_1$ and $P_7$ than it is to the vectors for page $P_6$. Similarly, the vectors for users $U_3$ and $U_6$ are in close proximity to the vector for page $P_5$. Although user $U_2$ has not interacted with any of pages $P_1$ through $P_8$, a determination of the likelihood of user $U_2$ interacting with each of pages $P_1$ through $P_8$ can be made by determining the distance between the vector for user $U_2$ and each of the vectors for pages $P_1$ through $P_8$. That is, a user is deemed more likely to interact with pages whose vectors are closer in proximity to the user's vector. For example, based on the examples of FIG. 3A and FIG. 3B, a determination may be made that user $U_2$ is more likely to interact with page $P_6$ than with page $P_1$.

Returning to FIG. 2, The embedding store 235 stores the embeddings (i.e., arrays) that are generated by the embedding generator 230. In some embodiments, the embedding store 235 allocates memory space for storing embeddings. The embedding store 235 can estimate the amount of computer memory that will be needed to store embeddings based on the number of embedding features, the lengths of the embedding arrays for different features, and sizes of hash tables used to store embeddings for each feature. The embedding store 235 may store current and past embeddings that have been generated for entities of the online system 140 with respect to various features. In some embodiments, the embedding store 235 stores embeddings in hash tables so that they can be accessed efficiently.

Figure 4:
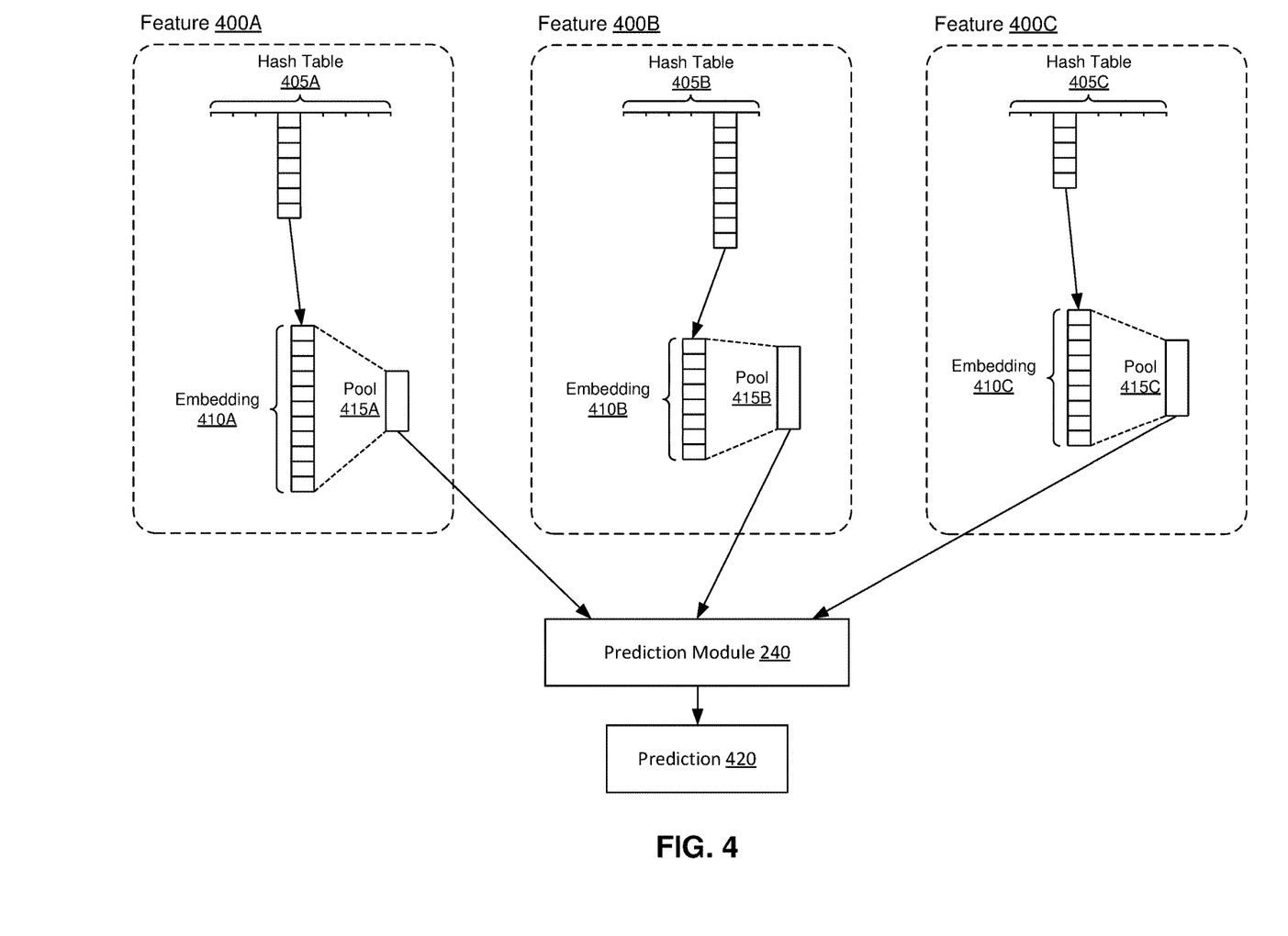
FIG. 4 illustrates a process for accessing and using feature embeddings, in accordance with an embodiment.

Referring to FIG. 4, it illustrates a process for accessing and using feature embeddings, in accordance with an embodiment. Accessing embeddings may involve accessing the array values that are stored in the embedding store 235. The example of FIG. 4 depicts a process of applying embeddings 410 for three features 400 as input to the prediction module 240. For example, the features 400A, 400B, and 400C could represent comments to a page of the online system 140, users who follow a page of the online system 140, and shares of a page of the online system 140, respectively. In some embodiments, to generate a prediction 420, the prediction module 240 may use other features in addition to features 400A-C and the other features may not be embeddings. For example these additional features may be input data from a user profile in the user profile store 205.

Because of the sheer number of users that interact with the online system 140, some users may share an embedding for a particular feature. In one embodiment, embeddings may be accessed via a hash table 405 in which users with shared embeddings are hashed to the same location. A hash table 405 for each feature 400 has a defined size, that is, a defined number of buckets into which data is sorted for the particular feature 400. The embedding 410 may represent all users who were sorted into the same bucket of the hash table 405 for the feature 400. In some embodiments, a pooling function is further applied to the embedding 410 to generate a pool 415. Pooling functions may be used to reduce the size of the embedding 410 before it is provided as input to the prediction module 240.

As an illustrative example, suppose the feature 400A as shown in FIG. 4 represents user comments to pages on the online system 140. Embeddings generated by the embedding generator 230 are sorted into the hash table 405A using a hashing function. A pooling function is applied to the embedding 410A to create a pool 415A, which may then be provided as feature input data to a prediction module 240.

Returning to FIG. 2, the prediction module 240 uses computer models, machine learning techniques, neural networks, and statistical analyses to generate predictions for the online system 140. A prediction may take the form of a predictive label (e.g., a true or false prediction) and a confidence score of the predicted label. The prediction module 240 uses feature embeddings as input data for some predictive algorithms. Other data used as input to predictive algorithms may include user profile information from the user profile store 205, content data from the content store 210, data about activities related to the online system 140, as stored in the action log 220, and connection data as stored in the edge store 225.

The embedding sizing module 245 adjusts the array length for each type of feature embedding. That is, the embedding sizing module 245 resizes the lengths of the arrays that will be generated by the embedding generator 230 (e.g., by updating a model that the embedding generator 230 uses to create embeddings for the feature). Adjusting the array size for individual features can optimize the amount of memory space that is used and improve the accuracy of the embeddings by removing superfluous values. To determine an extent to which a feature embedding can be resized, the embedding sizing module 245 evaluates how embedding values have changed over time. In particular, the embedding sizing module 245 may examine the differences between values stored at each index of previous and current embedding arrays for the feature. When the difference between the old and new values at an index is below a predetermined threshold amount across a predetermined number of the embeddings for the feature (i.e., the value has not changed significantly over time), the embedding sizing module 245 may reduce the embedding size of future embeddings of the feature by providing instructions to the embedding generator 230 to remove the index from the model for embeddings for that feature.

In some embodiments, the embedding sizing module 245 may also adjust sizes of hash tables 405 used to store the feature embeddings in the embedding store 235. The number of buckets of a hash table 405 that is used to access embeddings may affect the amount of memory that is needed to store the embeddings, as entities and users that are hashed to the same hash bucket may share an embedding in some cases. Thus, a smaller hash table, may result in fewer embeddings for a feature, with each embedding representing an increased number of entities of the online system. Additional detail about the embedding sizing module 245 is included in the description of FIG. 5.

The pooling appraisal module 250 generates comparisons between pooling functions that can be applied to feature embeddings. In one embodiment, the pooling appraisal module 250 can further generate a recommendation for which of a set of pooling functions is most useful for pooling data from an embedding for a particular feature. The pooling appraisal module 250 may receive as input one or more embeddings for a feature, as generated by the embedding generator 230. One or more pooling functions are applied to the embeddings. The resulting data pools can be transformed into visual pooling readouts by the pooling appraisal module 250, for example, by visualizing a feature response distribution using a principal component analysis transformation to present the pooling data two-dimensionally. Such readouts may be used by developers to view how feature embedding data is affected by different pooling functions and thus to choose which pooling function to apply when building and implementing models that use the feature embeddings. In some embodiments, the pooling appraisal module 250 can cluster the pooled data automatically using a clustering algorithm, and can then recommend pooling functions based on whether the feature embedding data becomes clustered when the functions are applied. For example, the pooling appraisal module 250 might examine a mean distance between objects to determine how evenly distributed the objects are as a result of the pooling function.

The semantic weighting module 255 generates comparisons of content, users, pages, objects, etc. The embedding generator 230 can be used to generate embeddings that represent objects of the online system 140. The semantic weighting module 255 determines cosine similarities between the various embeddings in the set within the latent space. Objects with embeddings that have similar values at the same indices are spatially near to each other within the latent space and are thus considered to be similar. The semantic weighting module 255 generates visualizations (e.g., two-dimensional graphs) that represent the similarities of the objects.

The feature visualization module 260 generates visualizations of feature embeddings. Specifically, the feature visualization module 260 creates a visual distribution of the data from feature embeddings and also shows relative ease or difficulty of predictions for the feature for some predictive purpose using labeled training data. A visualization may indicate a difficulty score, that is, whether predictions are "hard" or "easy" for the prediction module 240 to determine using the feature embeddings of a particular feature as input to a particular predictive algorithm. The resulting visualization shows whether the feature has a clustered distribution of "hard" and "easy" predictions when that feature is used for the particular kind of prediction. By adding these "hard" and "easy" labels to the visualization of the embedding data, it is possible to detect whether clustering occurs among the easy and hard data points. Such clustering can help to determine whether the particular feature embedding may be a good input for this type of prediction.

The web server 265 links the online system 140 via the network 120 to the one or more client devices 110, as well as to the one or more third party systems 130. The web server 265 serves web pages, as well as other content, such as JAVA®, FLASH®, XML and so forth. The web server 265 may receive and route messages between the online system 140 and the client device 110, for example, instant messages, queued messages (e.g., email), text messages, short message service (SMS) messages, or messages sent using any other suitable messaging technique. A user may send a request to the web server 265 to upload information (e.g., images or videos) that are stored in the content store 110. Additionally, the web server 265 may provide application programming interface (API) functionality to send data directly to native client device operating systems, such as IOS®, ANDROID™, or BlackberryOS.

Figure 5:
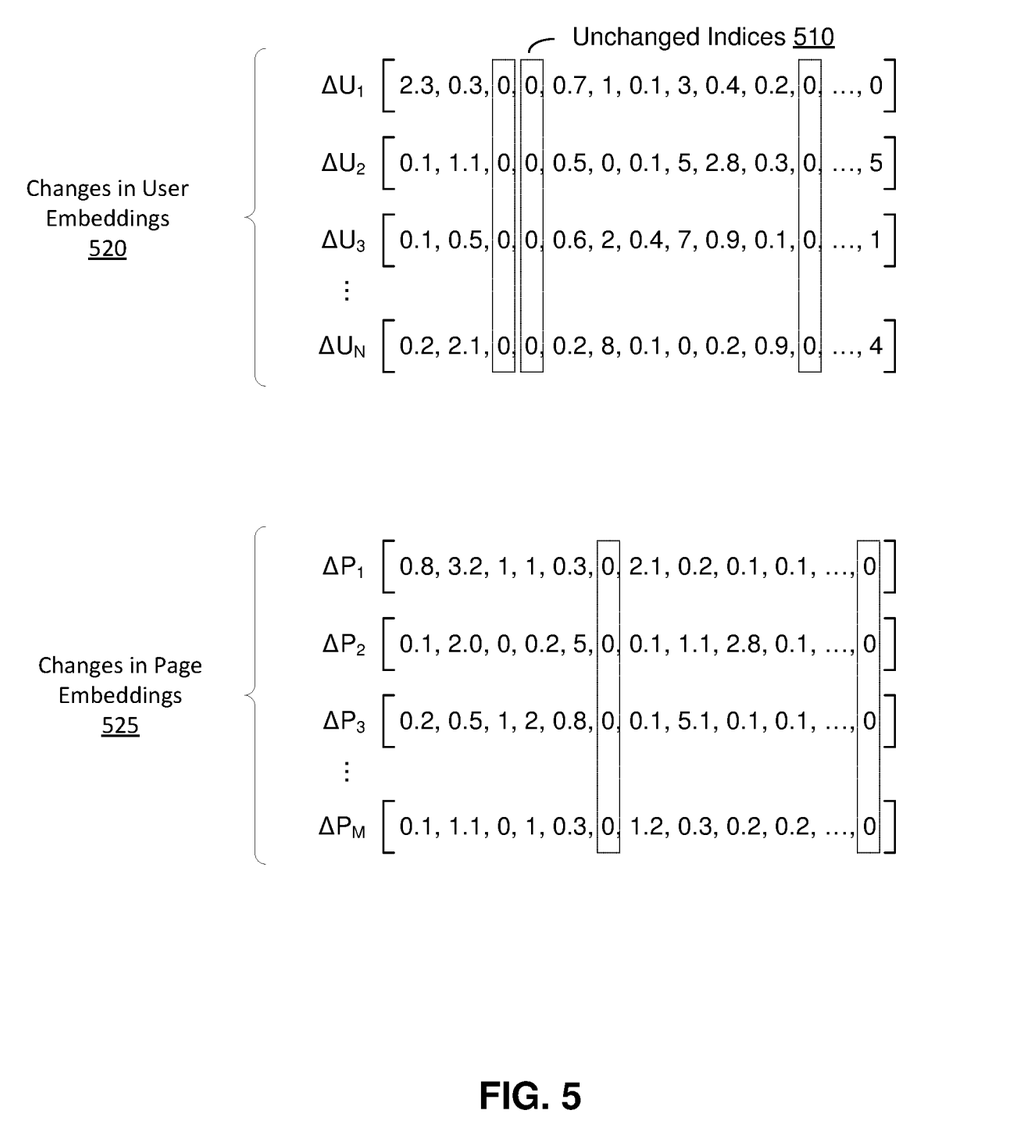
FIG. 5 illustrates data comparisons for user embeddings and page embeddings, in accordance with an embodiment.

FIG. 5 illustrates data comparisons for user embeddings and page embeddings, in accordance with an embodiment. As was shown in FIG. 3A and FIG. 3B, the user embeddings 320 and page embeddings 325 are vectors that represent the users and pages within a latent space. The embedding sizing module 245 analyzes how values of the vector indices that make up the embeddings change over time, for example, by comparing past embeddings from the embedding store 235. FIG. 5 shows changes in user embeddings 520 and changes in page embeddings 525. A vector for $\Delta U_1$, may, for example represent the difference between an embedding generated for user $U_1$ on a first day and an embedding generated for user $U_1$ on a second day a week later. That is, each value in a vector that represents a change in an embedding over time represents how the value at that index of the embedding has changed.

Based on a determination of the embedding changes, such as the changes in user embeddings 520 and the changes in page embeddings 525, the embedding sizing module 245 determines unchanged indices 510. The unchanged indices 510 are indices at which values stayed constant over time for all embeddings of a feature. For example, FIG. 5 shows three columns of unchanged indices 510 within the changes in user embeddings 520. In some embodiments, unchanged indices 510 may be indices which have undergone only a minor change, rather than only indices that have experienced zero change.

Having determined unchanged indices 510 within embeddings for a feature, the embedding sizing module 245 may reduce the size of the embeddings for that feature by retraining the embedding module 230 to represent embeddings for the feature without the dimensions represented by unchanged indices 510.

In some embodiments, the embedding sizing module 245 may similarly adjust the size of hash tables for a feature. In such cases, the embedding sizing module 245 may determine whether certain buckets in the hash tables for a feature are over-utilized or under-utilized. The size of the hash table may be altered accordingly. For example, if some hash buckets are never or are rarely used to store data, then the size of the hash table may be reduced. The embedding sizing module 245 may also change the size of a hash table for a feature to alter the feature embedding results. Since the embedding module 230 may generate an embedding using all data that is sorted into a bucket, having too many items sorted into a single bucket could cause an embedding to be too generalized to be useful as input to the prediction module 240.

Figure 6:
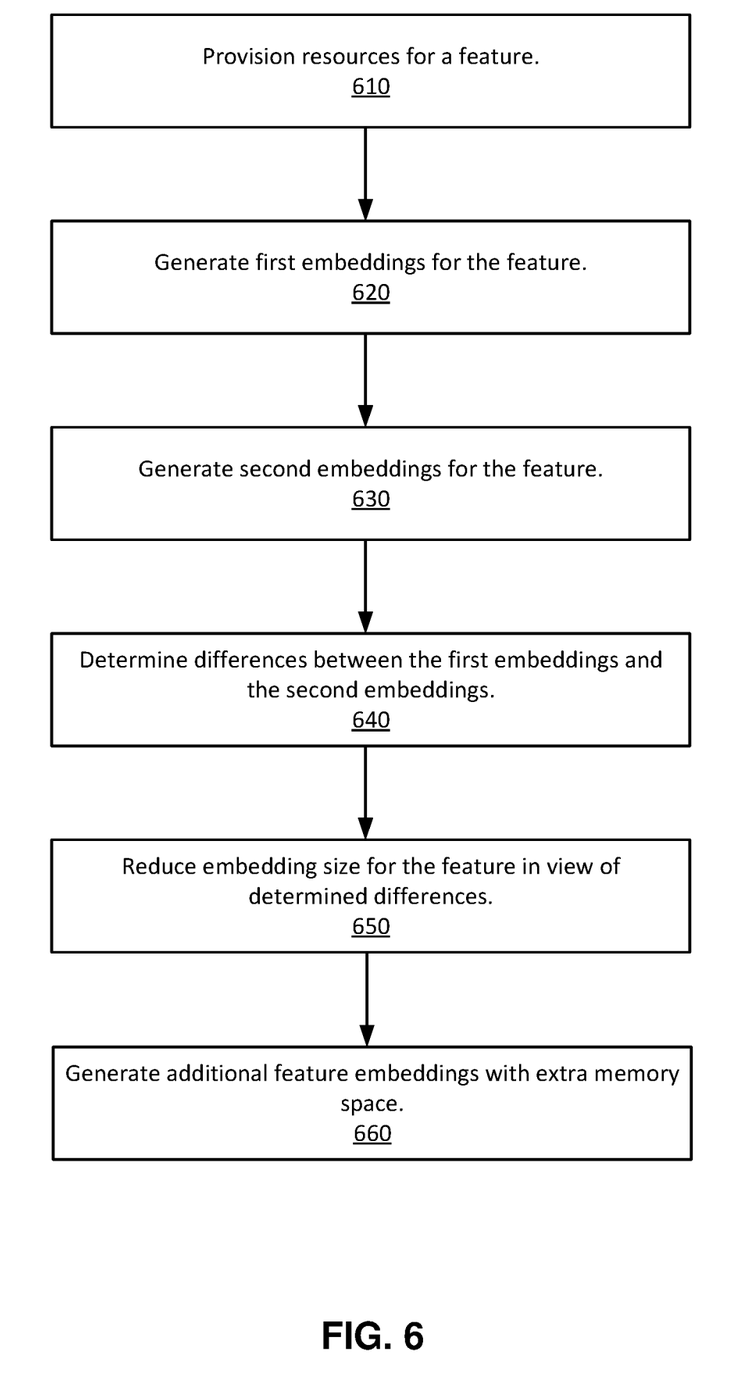
FIG. 6 is a flow chart illustrating a process for adjusting embeddings in accordance with an embodiment.

FIG. 6 is a flowchart illustrating a process of adjusting feature embeddings, in accordance with an embodiment. The online system 140 provisions 610 memory space to store embeddings for a feature. The online system 140 may initially allocate a predetermined amount of memory space to store embedding data for a feature, including initializing the size of a hash table for the feature and the embedding size (i.e., dimensions of latent space) of the feature. For example, a data set of 10 billion objects (e.g., content items, users, pages, etc.), may be sorted into a hash table with pre-allocated memory space for 10 million buckets, and the data in each bucket may be used by the embedding module 230 to generate embeddings with values for a pre-set 10,000 dimensions of latent space. Accordingly, the embedding module 230 generates 620 a first set of embeddings for the feature.

The online system 140 stores new data that is generated over time as users interact with objects of the online system. Using updated data, the embedding module 230 generates 630 second embeddings for the feature.

The embedding sizing module 245 determines 640 differences between the first embeddings and the second embeddings. For example, the embedding sizing module 245 may determine latent space dimensions (i.e., embedding indices) that do not change as input data for generating the embeddings changes. The embedding sizing module 230 reduces 650 the embedding size for the feature by removing static dimensions from the latent space in which embeddings for the feature are represented. Reducing the embedding size includes reducing the memory space that is initially allocated for embeddings that are generated for the feature in the future. When enough memory space is freed, for example, subsequent to the reduction in size of one or more feature embeddings, the online system 140 generates 660 new feature embeddings that can be stored in the extra memory space. Reducing embedding sizes and hash table sizes can save memory space, computing time, and computing power that is needed to produce embeddings and for the prediction module 240 to make predictions based on the embeddings.

Figure 7:
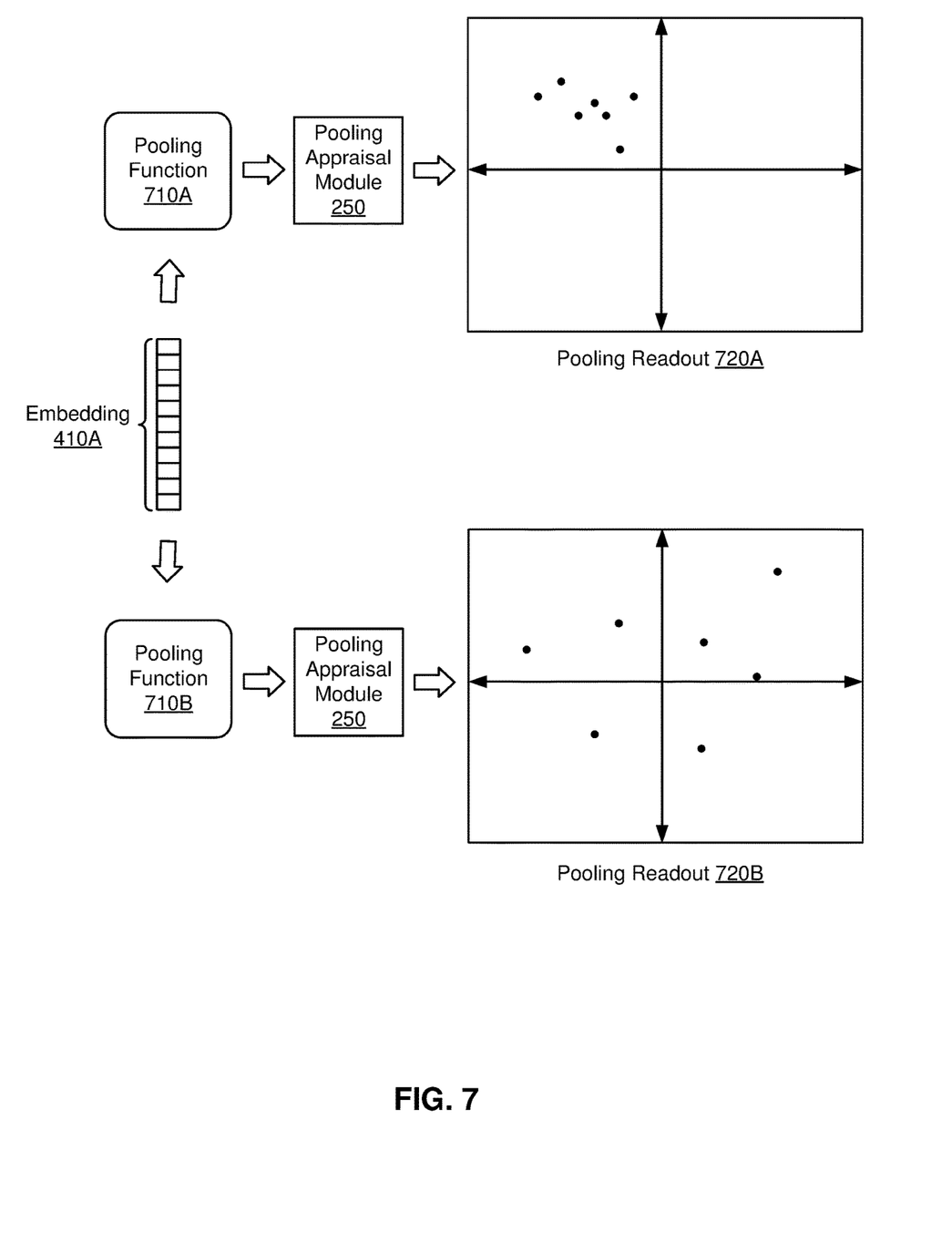
FIG. 7 is an example illustration of pooling readouts for pooling functions, in accordance with an embodiment.

FIG. 7 is an example illustration of pooling readouts for pooling functions, in accordance with an embodiment. An embedding, such as the embedding 410A may be generated by the embedding module 230 to represent a user, page, or object of the online system 140 with respect to a particular feature. Various pooling functions 710 can be used to reduce the size of the embedding 410 prior to using the data as input to a prediction module 240 of the online system. Examples of pooling functions that may be used to pool the data of an embedding 410 include maximum value, minimum value, and average value functions.

The pooling appraisal module 250 produces pooling readouts 720 from data output by the pooling functions 710. Pooling functions 710 affect the way data from an embedding 410 is represented to the prediction module 240, and some pooling functions 710 may characterize the data more effectively than others. For example, the pooling function 710A of FIG. 7 may produce clustered data when applied to the embedding 410A, whereas the pooling function 710B may cause an even distribution of data when applied to the embedding 410A.

The pooling appraisal module 250 produces pooling readouts 720. In one embodiment, pooling readouts 720 are generated using a principal component analysis to transform feature response data from an embedding 140 into two dimensions so the data can be easily visualized. In some cases, the pooling readouts 720 may be used by developers who can visually analyze the pooling readouts 720 to gain insight into which pooling functions 710 should be used for different programs and models. In some cases, the pooling appraisal module 250 uses machine learning or other algorithmic techniques to automatically determine a pooling function 710 from a set of potential pooling functions 710, that produces more effective results for embeddings 410 of a particular feature 400.

In addition to being used as input to a predictive module 265, embeddings may be used by the semantic weighting module 255 to determine similarities among content, pages, users, and other objects of the online system 140. For example, pages of the online system 140 may be compared by generating embeddings that represent the page identifications and determining cosine similarities between the resulting embeddings. If the cosine distance between the embeddings of two page IDs is small, then the pages may be similar. In one embodiment, the semantic weighting module 255 may generate a visualization of similarities between objects. Such a visualization may be generated using a principal component analysis transformation of the data into a two-dimensional graph.

Figure 8:
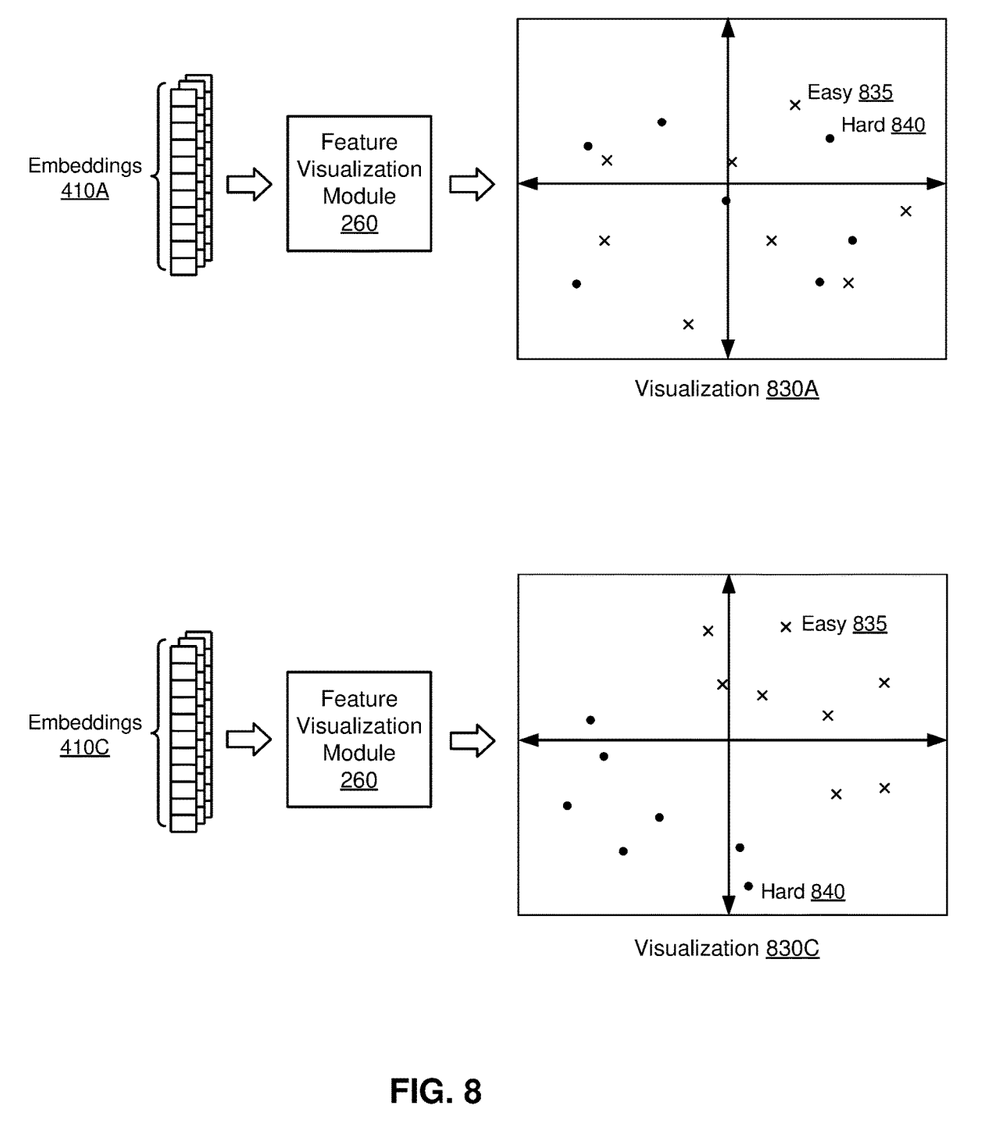
FIG. 8 is an example illustration of data visualizations generated by a feature visualization module, in accordance with an embodiment.

FIG. 8 is an example illustration of data visualizations generated by a feature visualization module, in accordance with an embodiment. FIG. 8 depicts visualizations 830 generated for applying different feature embeddings as input to a predictive algorithm. The resulting visualizations 830 can be used to determine whether the embedding generator 230 properly trains embeddings to characterize a feature 400. The visualizations 830 may also be used to determine whether a particular feature 400 provides valuable input for predictive models such as may be used by the prediction module 240.

As discussed in the description of FIG. 4, embeddings 410A for a particular feature 400A that have been generated by the embedding generator 230 can be retrieved from hash tables 405A where they are stored in the embedding store 235. The feature visualization module 260 accepts embeddings 410 associated with a feature 400 as input. In some embodiments, the feature visualization module 260 may accept pools 415 generated from the embeddings 410 rather than the embedding arrays themselves. The feature visualization module 260 generates a visualization of a distribution of the data from the embeddings. Data shown in the visualization may also be labeled as relating to relative ease or difficulty of a prediction for the underlying data item in view of some type of prediction.

As an illustrative example, the feature visualization module 260 may be used to generate a visualization of how effectively a feature embedding (e.g., embeddings 400C) is as input to a model in the prediction module 240 that predicts whether a user will like a content item. Such a model could take several types of feature embeddings as input. The feature visualization module 260 can generate a visualization 830C of the data related to content items the user has shared, as represented by embeddings 410C. The visualization module further labels the data points in the visualization with a difficulty score. In one embodiment, a difficulty score is an "easy" 835 or "hard" 840 label that represents how easy or hard it is for the prediction module 240 to produce a good prediction given the feature embeddings 410C as input. So in the example scenario, if, based on an embedding 410C, the prediction module 240 determines with 90% certainty that the user will like the content item, and user actually did like the content item, then the data point in the visualization is labeled as "easy" 835. If however, the prediction module 240 determines with 90% certainty that the user will like the content item, and the user did not like the content item, the visualization of the data point is labeled as "hard" 840, since the predictive model was confident but got the answer wrong.

Adding labels to the data points in the visualization of the embedding data allows a viewer to determine if the easy 835 and hard 840 data points are meaningfully clustered. The clustering of the easy and hard data points may indicate that a feature 400 as it is represented by the feature embeddings is a good input for making this type of prediction. For example, FIG. 8 shows a visualization 830A of embeddings 410A for a particular feature 400A in which the easy 835 and hard 340 labels are evenly distributed. The figure also shows another visualization 830C based on a different set of feature embeddings 410C in which the easy 835 and hard 840 data points are clustered in different areas of the graph. The clustering in the visualization 830C may indicate that the input embeddings 410C are a good input for the particular predictive model.

In some embodiments, the feature visualization module 260 can automatically detect whether input embeddings 410 will produce clustered easy 835 and hard 840 visualization data. For example, the feature visualization module may use clustering algorithms (e.g., k-means clustering, etc.) to determine whether the easy 835 and hard 840 data points in a visualization 830 are significantly clustered, and thus whether the feature embedding 410 provides useful input data to a given predictive model.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
generating, using an embedding model, a first set of embeddings representing objects of a system, the first set of embeddings based on information including interactions of users of the system with the objects, the embedding model indicating a first number of indices to include in an embedding, and each embedding comprising an array of first values stored in the indices;
subsequent to generating the first set of embeddings, receiving additional information about one or more of the objects, the additional information including additional interactions of users of the system with the objects;
generating, using the embedding model, a second set of embeddings representing the objects, each of the embeddings from the second set of embeddings comprising an array of second values stored in the first number of indices, wherein the second values are further based on the received additional information about one or more of the objects;
subsequent to generating the second set of embeddings, identifying, with a comparison of the indices of the array of first values of the first set of embeddings and the indices of the array of second values of the second set of embeddings, indices at which the differences between the second values and the first values is below a threshold value; and reducing the embedding model to a second number of indices to include in an embedding, the second number of indices not including the identified indices.

2. The computer-implemented method of claim 1, wherein the embedding model is trained to produce embeddings such that embeddings for objects that are likely to interact with one another have similar values at each index.

3. The computer-implemented method of claim 1, wherein objects include one or more of: users, pages, and content items.

4. The computer-implemented method of claim 1, wherein received information about an object includes one of: information about comments on a post, information about sharing a content item, information about accessing content items, or information about followed pages.

5. The computer-implemented method of claim 1, further comprising:

applying a plurality of pooling functions to the first set of embeddings to produce a plurality of pooled data sets; and analyzing the plurality of pooled data sets to determine a pooled data set of the plurality of pooled data sets that includes a most tightly clustered representation of the data of the embeddings.

6. The computer-implemented method of claim 5, further comprising:

providing the determined pooled data set as input to a predictive algorithm; and generating a prediction using the predictive algorithm, the prediction based in part on the pooled data set.

7. A non-transitory computer-readable storage medium storing computer program instructions executable by one or more processors of a computer system to perform steps comprising:

generating, using an embedding model, a first set of embeddings representing objects of a system, the first set of embeddings based on information including interactions of users of the system with the objects, the embedding model indicating a first number of indices to include in an embedding, and each embedding comprising an array of first values stored in the indices;

subsequent to generating the first set of embeddings, receiving additional information about one or more of the objects, the additional information including additional interactions of users of the system with the objects;

generating, using the embedding model, a second set of embeddings representing the objects, each of the embeddings from the second set of embeddings comprising an array of second values stored in the first number of indices, wherein the second values are further based on the received additional information about one or more of the objects;

subsequent to generating the second set of embeddings, identifying, with a comparison of the indices of the array of first values of the first set of embeddings and the indices of the array of second values of the second set of embeddings, indices at which the differences between the second values and the first values is below a threshold value; and reducing the embedding model to a second number of indices to include in an embedding, the second number of indices not including the identified indices.

8. The non-transitory computer-readable storage medium of claim 7, wherein the embedding model is trained to produce embeddings such that embeddings for objects that are likely to interact with one another have similar values at each index.

9. The non-transitory computer-readable storage medium of claim 7, wherein received information about an object includes one of: information about comments on a post, information about sharing a content item, information about accessing content items, or information about followed pages.

10. The non-transitory computer-readable storage medium of claim 7, the steps further comprising:

applying a plurality of pooling functions to the first set of embeddings to produce a plurality of pooled data sets; and analyzing the plurality of pooled data sets to determine a pooled data set of the plurality of pooled data sets that includes a most tightly clustered representation of the data of the embeddings.

11. The non-transitory computer-readable storage medium of claim 10, the steps further comprising:

providing the determined pooled data set as input to a predictive algorithm; and generating a prediction using the predictive algorithm, the prediction based in part on the pooled data set.

12. A computer-implemented method comprising:

applying a predictive model to a data set to identify predicted labels and a confidence score of the predicted label for each item in the data set, the predictive model using at least one embedding describing a feature of the items of the data set;

labeling each item in the data set with a difficulty score based on whether the predicted label matches a known value for the item and the confidence score of the predicted label;

rendering at a user device, a visualization of embeddings describing the feature of the items, the data set, and the label of the displayed items; and determining whether the embeddings are effective for the predictive model based on the rendered visualization of difficulty scores for the feature.

13. The computer-implemented method of claim 12, wherein a difficulty score is categorized as a hard label or an easy label, wherein an easy label represents a predicted label that is predicted correctly with high confidence, and wherein a hard label represents a predicted label that is predicted incorrectly with high confidence.

14. The computer-implemented method of claim 12, wherein the at least one embedding describing a feature of the items in the data set is pooled before being provided as input to the predictive model.

15. The computer-implemented method of claim 12, wherein the embeddings are effective for the predictive model when the visualization includes data that is clustered according to difficulty scores.

16. The computer-implemented method of claim 12, wherein determining whether the embeddings are effective for the predictive model based on the visualization of difficulty scores for the feature comprises applying a clustering algorithm to determine whether the difficulty scores are significantly clustered.

17. The computer-implemented method of claim 12, further comprising:

adjusting the use of the feature as input to the predictive model based on the determination of whether the embeddings are effective as inputs that represent the feature.

18. The computer-implemented method of claim 17, further comprising:
generating a prediction using the adjusted predictive model.

* * * * *